United States Patent [19]
Romanco

[11] Patent Number: 5,643,467
[45] Date of Patent: Jul. 1, 1997

[54] FILTER CARTRIDGE HAVING GASKET SEAL EMPLOYING PRESSURE RIDGES TO PREVENT LEAKAGE

[75] Inventor: Vincent P. Romanco, Naperville, Ill.

[73] Assignee: R.R. Street & Co. Inc., Naperville, Ill.

[21] Appl. No.: 434,417

[22] Filed: May 3, 1995

[51] Int. Cl.⁶ .................... B01D 37/00; B01D 35/00
[52] U.S. Cl. ............... 210/767; 210/806; 210/323.2; 210/232; 210/437; 210/445; 210/450
[58] Field of Search ..................... 210/323.2, 806, 210/232, 767, 437, 445, 450

[56] References Cited

U.S. PATENT DOCUMENTS

| | | | |
|---|---|---|---|
| 2,584,394 | 2/1952 | Marvel | 210/323.2 |
| 2,811,218 | 10/1957 | Winslow | 210/323.2 |
| 2,919,030 | 12/1959 | Grant et al. | 210/323.2 |
| 3,279,608 | 10/1966 | Soriente et al. | 210/323.2 |
| 3,442,390 | 5/1969 | Petrucci et al. | 210/323.2 |
| 3,959,147 | 5/1976 | Oakley et al. | 210/323.2 |
| 4,187,179 | 2/1980 | Harms | 210/323.2 |
| 4,336,043 | 6/1982 | Aonuma et al. | 210/323.2 |
| 5,022,986 | 6/1991 | Lang . | |
| 5,141,637 | 8/1992 | Reed et al. | 210/323.2 |
| 5,178,753 | 1/1993 | Trabold | 210/323.2 |

FOREIGN PATENT DOCUMENTS

| | | |
|---|---|---|
| 0529782 | 3/1993 | European Pat. Off. . |
| 2262356 | 8/1973 | Germany . |
| 793286 | 4/1958 | United Kingdom . |
| 1569991 | 6/1980 | United Kingdom . |
| 2254268 | 10/1992 | United Kingdom . |
| 2265842 | 10/1993 | United Kingdom . |

OTHER PUBLICATIONS

International Search Report of Application No. PCT/US 96/06298, dated Aug. 9, 1996.

*Primary Examiner*—Robert J. Popovics
*Attorney, Agent, or Firm*—Mayer, Brown & Platt

[57] ABSTRACT

Filter cartridge that prevents leakage of unfiltered fluid, as well as filter system and method using the same, are provided. The filter system includes a housing having an inlet for introducing unfiltered fluid into the housing and an outlet extending into the housing for draining filtered fluid after filtration occurs. A series of filter cartridges are positioned on the outlet within the housing, and gaskets are placed between adjacent filter cartridges and at each extreme end of the series. Each filter cartridge includes filter material configured in a tubular shape and opposite end walls located at the ends of the filter material. An aperture is formed through each end wall to receive the outlet when the filter cartridge is positioned thereon, and concentric pressure ridges are located on each end wall so as to substantially encompass the aperture. The pressure ridges extend outwardly from the end wall to engage the adjacent gasket and prevent leakage of unfiltered fluid between the end wall and the gasket.

25 Claims, 4 Drawing Sheets

FILTER CARTRIDGE HAVING GASKET SEAL EMPLOYING PRESSURE RIDGES TO PREVENT LEAKAGE

BACKGROUND OF THE INVENTION

1. Field of the Invention

The present invention relates to a method and apparatus for preventing leakage of unfiltered fluid through a filter system. Particularly, the present invention is directed to a filter cartridge configured to prevent leakage of unfiltered fluid, as well as a filter system and method using the same.

2. Description of Related Art

Fluid and hydraulic systems are commonly used to satisfy a variety of commercial and domestic needs. A common problem shared by such systems, especially closed systems that continuously recycle fluid for reuse, is contamination. Soluble and insoluble contaminants become entrained in the fluid, often building up in system components and adversely impacting overall efficiency. Such contamination results in increased operating and maintenance costs, as well as possible disruption of service when acceptable contamination levels are exceeded. In fact, contamination actually may render some fluid or hydraulic systems useless if untreated, or if the system is sensitive to the presence of contaminants.

To address the problems associated with contamination, a variety of filtration and contaminant removal methods have been developed. One such method uses integral filter units, commonly known as filter cartridges, for the removal of contaminants. A conventional filter cartridge includes filter material held securely between opposite planar end walls. The filter material is configured into a tubular shape having a hollow center extending between the opposite planar end walls, and each planar end wall is provided with a central aperture in alignment with the hollow center. Outer and inner walls likewise extending between and securely connected to the planar end walls also may be provided to encase the filter material.

In operation, one or more filter cartridges are mounted within a filter system. The filter system includes a filter housing that is usually similar in shape to the filter cartridge, but large enough to contain one or more filter cartridges positioned end to end. For example, it is not uncommon for ten (10) or possibly more filter cartridges to be positioned end to end within a single filter housing. An inlet is provided, typically connected to the peripheral wall of the filter housing, for introducing unfiltered fluid into the filter housing. Likewise, a perforated center pipe is provided for supporting and positioning the plurality of filter cartridges within the filter housing, as well as for draining fluid that has passed through the filter cartridges.

The shape and size of the filter housing center pipe corresponds to the apertures provided through the planar end walls of each filter cartridge. Each filter cartridge thus may be mounted within the housing by inserting the center pipe through the apertures. In this manner, unfiltered fluid is introduced into the filter housing by the inlet and directed inwardly through the filter material for filtration before passing through the perforations of center pipe, such that filtered fluid is drained back to the fluid system for reuse.

Gaskets, typically made of felt or other deformable material, are placed on the housing center pipe between the planar ends of adjacent filter cartridges, as well as at each extreme end of the plurality of filter cartridges. The purpose of the felt gaskets is two-fold. First, the gaskets are provided to seal the exposed perforations along the housing center pipe between adjacent filter cartridges. Second, the gaskets are intended to seal the annular gap created proximate the planar ends of each filter cartridge between the apertures and the center pipe of the fluid housing.

Unfortunately, the effectiveness of the gaskets in sealing against leakage is typically limited, particularly once filtration has been initiated. This is because contaminants that collect on the filter material tend to restrict flow through the filter cartridges. If sufficient back pressure develops within the filter housing due to this flow restriction, unfiltered fluid finds a less restrictive flow path between the planar end of a filter cartridge and the adjacent gasket rather than through the filter cartridge itself. Additional factors that attribute to leakage include undetected defects in either the gaskets or the planar ends of the filter cartridges, which prevent full surface contact therebetween, and deflection of the housing center pipe due to the weight of the filter cartridges, thus causing nonuniform pressure on the gaskets by the planar ends of the filter cartridges.

To some extent, it has been determined that the effectiveness of the gaskets may be improved by increasing the compression on the gaskets against the planar ends of the filter cartridges. This may be performed by tightening a threaded nut on the end of the housing center pipe so as to press the filter cartridges and gaskets against each other. It is believed, however, that only little benefit is achieved by this tightening process since the threat of stripping the threaded end of the center pipe or deforming the planar end walls limits the extent of compression available.

In view of the above, there remains a need for a cost effective method and apparatus for preventing leakage of unfiltered fluid through filter systems using filter cartridges.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus and method particularly pointed out in the appended claims.

To achieve these and other advantages and in accordance with the purpose of the invention, as embodied and broadly described herein, a novel filter cartridge that prevents leakage of unfiltered fluid and a filter system using the same are provided. The filter system includes a housing having an inlet for introducing unfiltered fluid into the housing and an outlet extending into the housing for draining filtered fluid from the housing after filtration has occurred. At least one filter cartridge of the present invention is to be positioned on the outlet within the housing of the filter system.

The filter cartridge of the present invention includes filter material configured in a tubular shape having opposite ends, and a planar end wall located at each end of the filter material. Each end wall has an inside surface facing the filter material, an outside surface opposite the inside surface, and an aperture formed therethrough corresponding to a cross-section of the outlet such that the outlet may be received by the apertures to position the filter cartridge thereon within the housing. When properly positioned, the filter material surrounds the outlet. Additionally, the filter cartridge embodied herein may include porous outer and inner tubular walls longitudinally extending between and securely attached to the planar end walls so as to encase the filter material, although such walls are not necessary if sufficiently rigid filter material or a reinforcing structure is used.

The filter system further includes a gasket placed, adjacent each end of the filter cartridge, on the outlet within the housing. As such, when a series of filter cartridges are positioned end to end on the outlet, gaskets are placed between adjacent filter cartridges as well as at each end of the series. To enhance sealing and prevent leakage of unfiltered fluid, a pressure ridge is provided on each end wall of the filter cartridge so as to substantially encompass the aperture formed through the end wall. The pressure ridge extends outwardly from the outside surface of the end wall for sealing engagement with the adjacent gasket. Preferably, each gasket is made of deformable material so as to deform when in sealing engagement with the pressure ridge. A locking device is also provided to secure the filter cartridge and adjacent gaskets on the outlet in sealing engagement with each other.

The pressure ridge may be located on each end wall as an impression that forms a protrusion on the outside surface of the end wall, or as a bead attached to the outside surface of the end wall. The pressure ridge preferably is formed on each end wall as a circle that is concentric with the aperture extending therethrough, although alternative shapes are possible. One or more additional pressure ridges may be located on each end wall so as to substantially encompass the first pressure ridge. Each pressure ridge may be a single continuous structure or a series of segments configured to substantially encompass the aperture so as to prevent leakage of unfiltered fluid to the outlet.

The objects and advantages of the present invention are further achieved by a method of preventing leakage of unfiltered fluid through a filter system. Generally, the method includes, among other things, the steps of locating an outwardly-extending pressure ridge on each end wall of a filter cartridge, as described above; positioning the filter cartridge on the outlet of a filter housing; and placing a gasket on the outlet adjacent each end of the filter cartridge so that the pressure ridge on each end wall is in sealing engagement with the adjacent gasket to prevent leakage of unfiltered fluid to the outlet. The steps of the invention also may include positioning a series of filter cartridges on the outlet and placing a gasket between adjacent filter cartridges; as well as securing the filter cartridge and adjacent end gaskets on the outlet in sealing engagement with each other.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

Reference will now be made in detail to the present preferred embodiment of the filter cartridge and filter system of the invention, examples of which are illustrated in the accompanying drawings. Wherever possible, the same reference characters will be used throughout the drawings to refer to the same or like parts. The method of the present invention will be described in conjunction with the detailed description of the filter cartridge and filter system for clarity.

The filter cartridge described and claimed herein, as well as the filter system and method using the same, may be incorporated in any of a variety of fluid or hydraulic systems. The apparatus and method of the present invention are particularly suited for a closed system, which recycles system fluid for reuse. One example of such a system is commonly used, for dry cleaning purposes. That is, the system fluid is a dry cleaning solvent used for cleaning a substrate, such as an article of clothing or similar delicate fabric. Once the solvent contacts the substrate within the dry cleaning fluid system, however, contaminants become entrained in and contaminate the solvent. The contaminants therefore must be continuously removed from the solvent in order to maintain the efficiency of the dry cleaning system, as well as to prevent recontamination of the substrate. This may be performed by connecting the filter system of the present invention in fluid communication with the dry cleaning fluid system.

Figure 1:
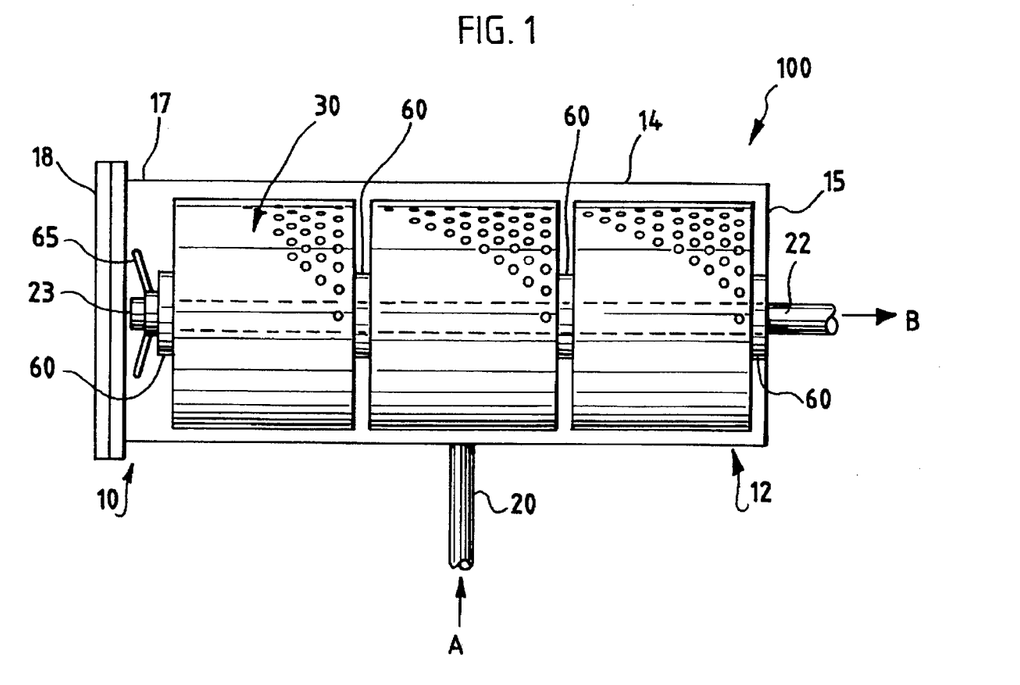
FIG. 1 is a side view of a schematic representation of the filter system of the present invention.

An exemplary embodiment of the filter system of the present invention is shown in FIG. 1 and designated generally by reference character 100. FIG. 1 shows that the fluid system includes a hollow housing 10, an inlet 20 for introducing unfiltered fluid into the housing 10 as depicted by arrow A, and an outlet 22 extending into the housing 10 for draining filtered fluid from the housing 10 after filtration has occurred as depicted by arrow B. Positioned within the housing 10 on the outlet 22 are at least one filter cartridge 30, as will be described in greater detail below, and a gasket 60 adjacent each end of each filter cartridge 30. The term "filtered fluid" as used herein is understood to refer to fluid that is introduced and passes through the filter cartridge 30 within the housing 10, while the term "unfiltered fluid" is understood as fluid that has not passed through the filter cartridge 30 within the housing 10.

The housing 10 embodied herein is hollow and generally includes a tubular wall member 14 having a closed end 15 and an opposite open end 17 so as to form a housing body 12. The housing body 12 may be formed as a single piece member that is vacuum drawn, stamped, molded, or cast into the appropriate shape. Alternatively, the housing body 12 may be fabricated by securely attaching a separate end piece, corresponding to closed end 15, to one end of a hollow tube, which is cut to size. The housing body 12 embodied herein is cylindrical in shape and of sufficient size to contain at least one filter cartridge 30, although dimensions sufficient to contain a greater number of filter cartridges 30 positioned end to end is preferred. For purpose of example, and not limitation, FIG. 1 shows the housing 10 being sized to contain three (3) filter cartridges 30.

The hollow housing 10 also includes a removable lid 18 to be mounted on the housing body 12 for selectively closing and sealing the open end 17. The removable lid 18 may be mounted by threaded engagement with the housing body 12, or by a conventional clamping device. The housing body 12 and lid 18 are preferably made of metal, although alternative materials sufficiently durable to withstand the expected operating parameters of the fluid system may be used.

The inlet 20 to the filter system 100 is a conventional pipe structure connected in fluid communication with the fluid system for receiving unfiltered fluid from the fluid system, and introducing the unfiltered fluid into the filter housing 10 for subsequent filtration. Fluid flow through the inlet 20 is established by maintaining an adequate pressure differential across the filter system 100, or by providing a pump (not shown) to either force or draw the unfiltered fluid through the filter system 100. As shown in FIG. 1, the inlet 20 is preferably connected to the tubular wall 14 of the housing body 12 such that unfiltered fluid is introduced into the housing 10 along an outer peripheral portion thereof. Such connection may be by welding, threaded engagement, or other common techniques, or the inlet 20 may be formed integral with the housing 10 as a single piece.

Figure 6:
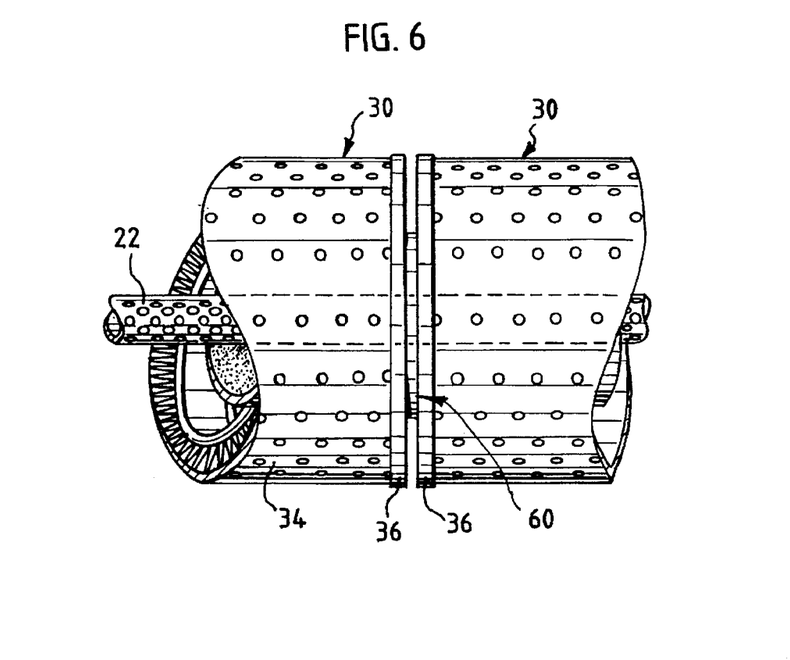
FIG. 6 is an enlarged fragmentary side view of two filter cartridges positioned in the filter system shown in FIG. 1.

The outlet 22 embodied herein is a tubular pipe that penetrates the closed end 15 of the housing body 12 and extends substantially the entire length of the housing 10, preferably along the center axis of the housing body 12 as shown in FIGS. 1 and 6. The outlet 22 is used not only for draining filtered fluid, but also for supporting filter cartridges and gaskets within the housing 10 as will be described in greater detail below. The length of the outlet 22 within the housing 10 therefore is at least greater than or equal to the cumulative overall length of the filter cartridges and gaskets to be positioned within the housing 10. Since the outlet 22 also is used for draining filtered fluid from the housing 10 after filtration has occurred, a predetermined length of the outlet 22 within the housing 10 is perforated for this function. Although generally understood as being provided with one or more holes, the term "perforated" herein likewise refers to the use of similar porous structures. The predetermined length of perforation is less than the cumulative overall length of the filter cartridges 30 and gaskets 60 to be positioned within the housing 10, and therefore is not visible in FIG. 1 but is shown in FIG. 6.

To prevent undesirable leakage of unfiltered fluid from the housing 10, the penetration interface between the outlet 22 and the closed end 15 of the housing body 12 is sealed. Likewise, the free end 23 of the outlet 22 proximate the open end 17 of the housing 10 is closed to prevent unfiltered fluid from draining into the outlet 22 without first passing through a filter cartridge 30. Metals, plastics, or similar durable materials may be used for the construction of the outlet 22.

As previously mentioned, and as embodied herein, at least one filter cartridge 30 is positioned on the outlet 22 within the housing 10 for removing contaminants from the fluid passing therethrough. FIG. 1 shows, however, that a plurality or series of filter cartridges 30 are preferred, with the actual number of filter cartridges 30 used depending upon the demands of the system. Although a range of between one (1) and ten (10) filter cartridges 30 in a filter system 100 is expected, more may be positioned within the housing 10 if necessary. Since each of the filter cartridges 30 are substantially identical in configuration with each other, reference need only be made to one filter cartridge 30 for purpose of explanation and illustration unless otherwise noted.

Figure 2:
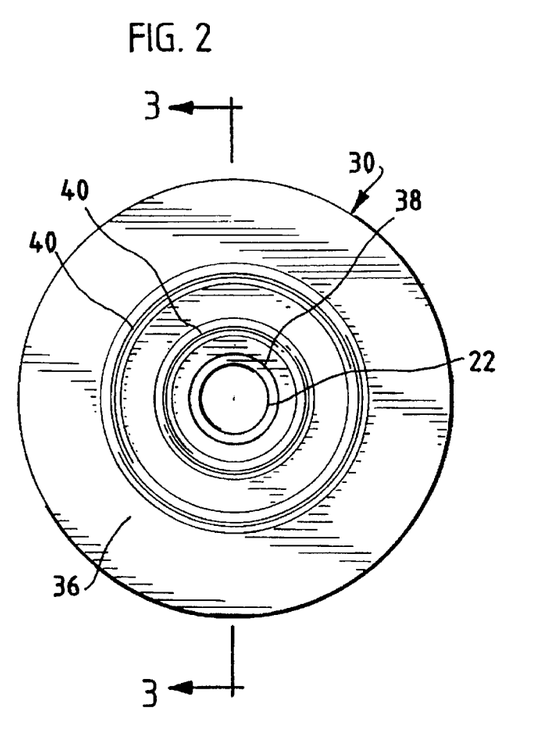
FIG. 2 is an end view of a filter cartridge shown in FIG. 1.
Figure 3:
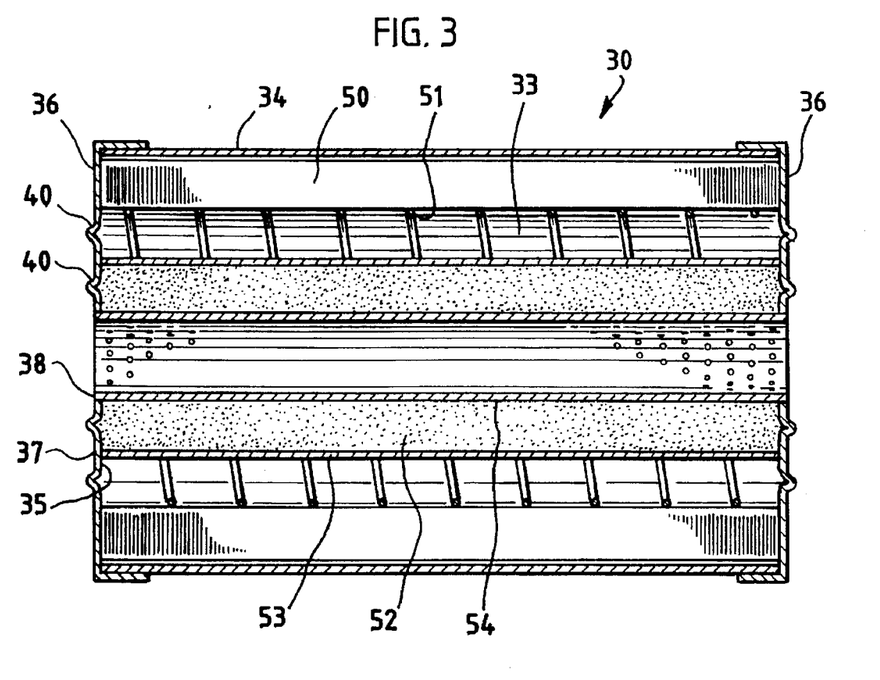
FIG. 3 is a cross-sectional side view of the filter cartridge of FIG. 2, taken along line 3—3.

The filter cartridge 30 of the present invention, as embodied herein and shown in FIGS. 2 and 3, includes filter material configured into a tubular shape. For example, and not by limitation, the filter cartridge 30 embodied herein and shown in FIG. 3, includes pleated filter paper 50 configured into a cylindrical shape and having a mean particle retention of between about 5 and about 50 microns. The pleated filter paper 50 is provided for removing insoluble contaminants from the fluid passing through the filter system 100. A wire coil 51 or similarly porous reinforcing structure may be used to support the inner periphery of the pleated filter paper 50, as shown in FIG. 3. The term "porous structure" as used herein refers to any structure configured to allow fluid flow therethrough, including, but not limited to, perforated or honeycomb walls. Similar filter material for removing insoluble contaminants may be used in place of or in combination with the pleated filter paper 50.

Although FIGS. 2 and 3 show that the preferred shape of the filter cartridge 30, and thus the filter material 50, is cylindrical, alternate shapes are also possible. The dimensions of the filter cartridge 30 depend upon the demands of the system. It is expected, however, that the overall length of the filter cartridge 30 will be between about 6 and 40 inches, and its outer diameter will be between about 2 and 16 inches.

Provided at each end of the filter material 50 is a planar end wall 36. Each end wall 36 includes an inside surface 35 facing the filter material 50, an outside surface 37 opposite the inside surface 35, and an aperture 38 formed therethrough corresponding to the cross-section of the outlet 22. Specifically, the apertures 38 are configured to receive the outlet 22 when the filter cartridge 30 is positioned within the housing 10. This may be performed by removing the lid 18 of the housing 10, and sliding the filter cartridge 30 onto the outlet 22 in a sleeve-like manner. In this manner, the filter material 50 surrounds the outlet 22 when the filter cartridge 30 is positioned inside the housing 10.

If the filter material used is sufficiently rigid, the filter cartridge may be constructed by connecting the end walls 36 directly to the filter material, as well as to the wire coil 51 if provided. Alternatively, however, and as embodied herein for purpose of explanation, the filter cartridge 30 also may include an outer wall 34 extending between and connected to the opposite end walls 36 so as to encase the filter material 50. If provided, the outer wall 34 is preferably made of metal, although alternative materials sufficiently durable to withstand the expected operating parameters of the fluid system may be used. Additionally, the outer wall 34 must be sufficiently porous to allow unfiltered fluid to pass therethrough for subsequent filtration by the filter material 50. For example, a sufficient number of holes having a diameter between about 1/8 and 3/8 inch may be provided through the outer wall 34 to allow fluid flow to the filter material 50, or the outer wall 34 may be fabricated using a similarly porous configuration or material.

A second filter material also may be provided, in addition to or in place of the first filter material, for removing soluble contaminants from the fluid. In the preferred embodiment of the present invention, the second filter material includes a core 52 of adsorbent material, such as granular activated carbon, clay, or a mixture thereof. The core 52 embodied herein is located within the inner periphery of the tubular shape of the first filter material 50, and preferably supported by an intermediate wall 53 and an inner wall 54, as shown in FIG. 3. Alternatively, if the first filter material were eliminated so only adsorbent material were provided, the use of an intermediate wall 53 would not be necessary.

Both the intermediate wall 53 are perforated with a are perforated with a plurality of small openings, preferably lanced openings of about ⅛ inches to about ⅜ inches long and. about 0.006 inches to about 0.010 inches wide spaced about 8 to 12 openings per inch, or fabricated with a similarly porous structure. The inner wall 54 extends the entire length of the filter cartridge 30, and is securely attached to the opposite end walls 36 proximate the edge of each aperture 38. This may be preformed by either welding or forming a rolled seam lock, for example. In this manner, the inner wall 54 provides a continuous structure along which the outlet 22 may slide so as to be received by both apertures 38 as the filter cartridge 30 is positioned within the housing 10. Hence, although the inner wall 54 may not be required when the second filter material 52 is not provided, the filter cartridges 30 embodied herein preferably include the inner wall 54 to simplify assembly of the filter system 100.

To prevent leakage of unfiltered fluid through the filter system 100, and in accordance with the present invention, the filter cartridge 30 further includes at least one pressure ridge located on each end wall 36. Each pressure ridge is configured to substantially encompass the aperture 38 formed through the corresponding end wall 36, and extend outwardly from the outside surface 37 of the end wall 36. In this manner, and as will be described in detail below, each pressure ridge provides a sealing engagement with a gasket 60 placed adjacent to the end wall 36. FIGS. 2 through 5 and 7 through 11 show representative embodiments of the pressure ridge, as designated generally by reference character 40.

The overall shape of the pressure ridge 40 of the present invention, as seen from an end view of the filter cartridge 10, is virtually unlimited. For example, the pressure ridge 40 may be configured in any of a variety of geometric or random shapes or patterns, including polygons, circles, stars, ellipses, and even spirals, provided the aperture 38 formed through the end wall 36 is substantially encompassed by the pressure ridge 40. In the preferred embodiment, the pressure ridge 40 is provided with a shape similar to that of the aperture 38 formed through the corresponding end wall 36. For example, and not limitation. FIG. 2 shows that the shape of the aperture 38 is a circle, and further shows that the pressure ridge 40 on each end wall 36 forms a circle concentric with the aperture 38.

Figure 4:
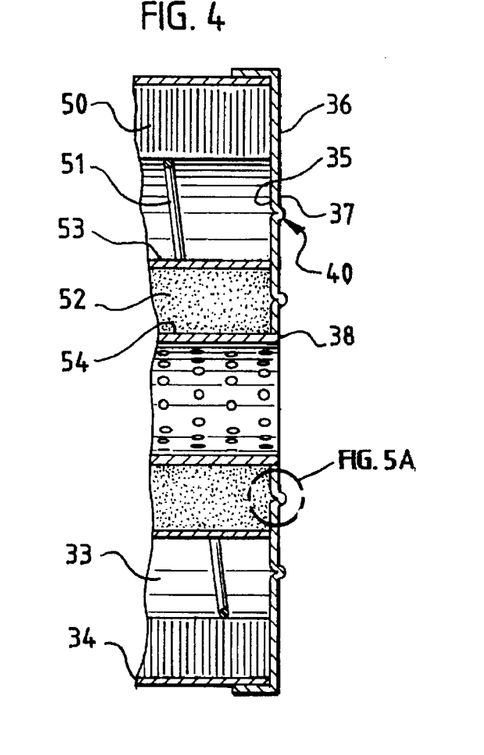
FIG. 4 is an enlarged fragmentary view of an end of the filter cartridge shown in FIG. 3.

Further in accordance with the present invention, any reasonable number of pressure ridges 40 may be located on each end wall 36. The filter cartridge 30 embodied herein, as shown in FIGS. 3 and 4, includes two pressure ridges 40 located on each end wall 36, the second pressure ridge 40 concentric with and substantially encompassing the first pressure ridge 40. Alternatively, the filter cartridge 30 may include several concentric pressure ridges 40, or only one pressure ridge 40 on each end wall 36. Each pressure ridge 40 may be formed as either a single continuous structure, as shown in FIG. 2, or a series of separate segments configured to substantially encompass the aperture 38 so as to prevent leakage of unfiltered fluid to the outlet 22 when in sealing engagement with an adjacent gasket 60.

With regard to dimensions, it is generally preferred that the overall shape of each pressure ridge 40 is at least about one inch greater than the cross-sectional dimension of the outlet 22, although a range of between one and three inches greater than the outlet 22 is preferred. For example, when intended to be positioned within a housing 10 having a three-inch diameter outlet 22, it is preferred that the filter cartridge 30 has a pressure ridge 40 on each end wall 36 having a diameter of at least about four inches. Of course, the overall dimension of the pressure ridge 40 is likewise limited by the size of the end wall 36 itself.

Figure 5A:
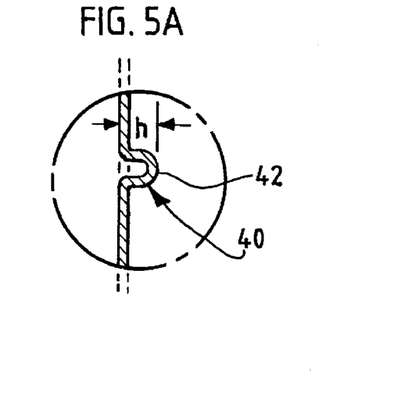
FIG. 5A is a detail view of the pressure ridge formed by providing an impression.

FIG. 5A shows a detail view of a cross section of the pressure ridge 40 embodied herein. The pressure ridge 40 is preferably formed with a curved outer surface 42 having a radius of at least about ¹⁄₃₂ inch, wherein a range of between ¹⁄₃₂ and ³⁄₃₂ is more preferred. As shown in FIG. 5A, the pressure ridge 40 is slightly elongated, preferably having an overall height "h" between about ¹⁄₃₂ and ½ inch above the outside surface 37 of the end wall 36, with an even more preferred height "h" between about ¹⁄₁₆ and ³⁄₁₆ inch. These dimensions have been found to facilitate an effective seal with an adjacent gasket 60.

Figure 5B:
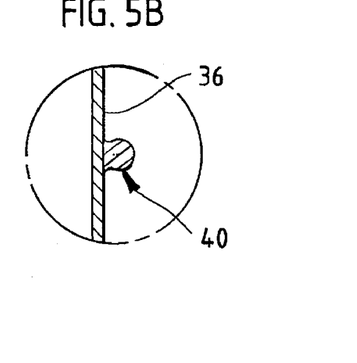
FIG. 5B is a detail view of the pressure ridge formed by providing a bead.

The pressure ridges 40 of the present invention may be located or formed on the end walls 36 in a variety of ways. For example, each end wall 36 may be made by stamping, casting, injection molding, or other similar techniques, using suitable material, so as to integrally include the pressure ridge 40 as a single piece with the end wall 36. Alternatively, the pressure ridge 40 may be attached as a bead of material to the outside surface 37 of each end wall 36 as shown in FIG. 5B. Acceptable materials that may be used for the bead include metals, plastics, curable resins, or similar durable materials that are compatible with the end wall material and the fluid being used. Preferably, however, the pressure ridges 40 are formed by providing an impression on each end wall 36. By using sheet or plate material for each end wall 36, the impression may be stamped or vacuum drawn so as to form an outwardly-extending protrusion on the outside surface 37 of the end wall 36.

As previously mentioned, a gasket 60 is placed adjacent each end of the filter cartridge 30 for sealing engagement with a corresponding pressure ridge 40. Particularly, each gasket 60 embodied herein preferably is a washer shaped member having a central aperture for receiving the outlet 22, and made of a deformable material, such as felt or an elastomeric material, so as to deform when engaged by the pressure ridge 40. Since the present invention reduces the surface area contacting the gasket 60, as compared with the surface area of a conventional filter cartridge, local deformation of the adjacent gasket 60 is significantly increased when in sealing engagement with the pressure ridge 40. In turn, this increased local deformation along the pressure ridge 40 enhances the sealing capacity of the gasket 60, and prevents leakage of unfiltered fluid to the outlet 22.

Since the preferred embodiment of the present invention includes a series of filter cartridges 30 positioned end to end on the outlet 22, at least one gasket 60 is placed between adjacent filter cartridges 30 and adjacent each extreme end of the series of filter cartridges 30. This arrangement is shown in FIGS. 1 and 6, and best accomplished, with the lid 18 of the housing 10 removed, by first sliding a gasket 60 onto the outlet 22 in a sleeve-like fashion toward the closed end 15 of the housing body 12, and then alternately sliding filter cartridges 30 and gaskets 60 onto the outlet 22 until the desired number of filter cartridges 30 are in position. To complete the assembly, a final gasket 60 is placed on the exposed end of the filter cartridge 30 positioned closest the open end 17 of the housing body 12.

Preferably, a locking device is provided to secure the filter cartridges 30 and adjacent end gaskets 60 on the outlet 22 in sealing engagement with each other. For example, and not limitation, the filter system 100 embodied herein includes a threaded fastener 65 to engage the free end 23 of the outlet 22. The threaded fastener 65 may be tightened to increase compression of the gaskets 60 and further enhance sealing, at least to a limited degree. Alternatively, a clamp or similar device may be provided for the same purpose. Once adequately secured, the housing 10 is closed and sealed for subsequent operation by replacing the removable lid 18.

In operation, unfiltered fluid is introduced from the fluid system into the filter housing 10 along an outer peripheral portion by the inlet 20, and then passes through the outer perforated wall 34, if provided, of the filter cartridges. 30. The sealing engagement between the gaskets 60 and the pressure ridges 40 prevent inadvertent leakage of the unfiltered fluid directly to the outlet 22. Once inside the filter cartridges, the fluid is filtered through the pleated filter paper 50 and the adsorbent core 52, if present, for removal of contaminants before passing through the perforations of the inner wall 54 and outlet 22 for reuse in the fluid system. Since leakage is prevented, only filtered fluid is recycled to the fluid system.

Figures 7, 8:
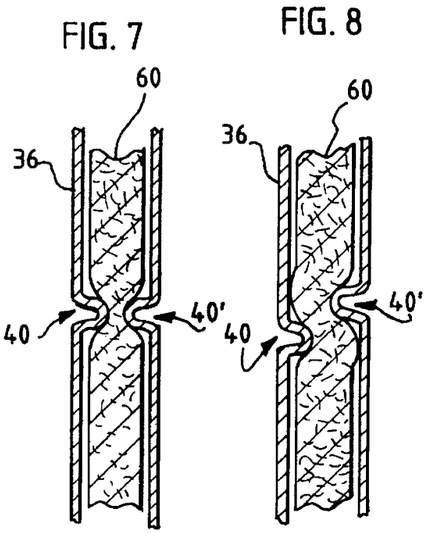
FIG. 7 is an enlarged fragmentary cross-sectional view showing one relationship between the pressure ridges of adjacent filter cartridges.
FIG. 8 is an enlarged fragmentary cross-sectional view showing another relationship between the pressure ridges of adjacent filter cartridges.

An additional aspect of the invention includes altering the relationship between the pressure ridges 40 on the end wall 36 of one filter cartridge 30 relative to the pressure ridges 40 on an adjacent filter cartridge 30. For example, one preferred embodiment includes locating pressure ridges 40 and 40' of substantially similar overall dimension, e.g., diameter, in alignment with each other on the end walls 36 of adjacent filter cartridges as shown in FIG. 7. This arrangement effectively doubles the amount of local deformation of the gasket 60 between the adjacent filter cartridges, and simplifies assembly since identical filter cartridges may be used.

Alternatively, FIG. 8 shows another possible relationship between the pressure ridges 40 and 40' of adjacent filter cartridges, wherein the overall dimension or diameter of one pressure ridge 40 is slightly larger or smaller than the overall dimension of the pressure ridge 40' of the adjacent filter cartridge. In this manner, the pressure ridges 40 and 40' substantially interlock such that the local deformation on one side of the gasket 60 is offset from the local deformation on the other side of the gasket 60, and a more torturous flow path is created.

Although FIGS. 7 and 8 depict only one pressure ridge 40 and 40' on each end wall, it will be appreciated that a plurality of ridges 40 and 40' may be positioned in alignment with or offset from each other on respective end walls 36 in accordance with the present invention.

Figure 9:
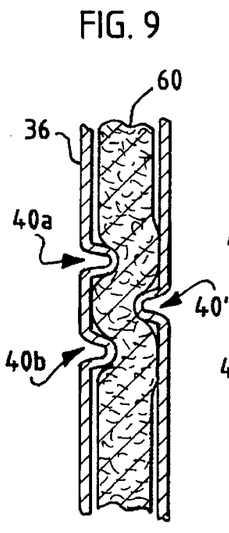
FIG. 9 is an enlarged fragmentary cross-sectional view showing an additional relationship between the pressure ridges of adjacent filter cartridges.
Figure 10:
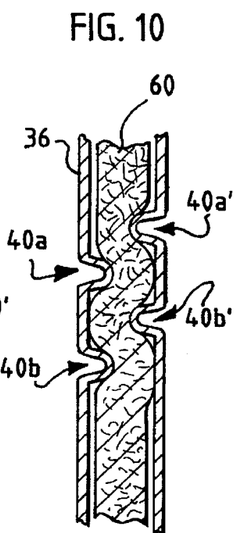
FIG. 10 is an enlarged fragmentary cross-sectional view showing a further relationship between the pressure ridges of adjacent filter cartridges.

For example, a further aspect of the invention, which is shown in FIG. 9, includes providing at least two concentric pressure ridges 40 of different overall dimensions, e.g., a larger diameter pressure ridge 40a and a smaller diameter pressure ridge 40b, on the end wall 36 of one filter cartridge while providing a pressure ridge 40' having an intermediate dimension or diameter on the adjacent filter cartridge. The pressure ridge 40' thus fits between and effectively interlocks with the two concentric pressure ridges 40a and 40b. A further alternative is shown in FIG. 10, wherein pressure ridges 40a' and 40b' are offset from and interlock with pressure ridges 40a and 40b. Again, a greater number of pressure ridges 40 may be provided on either or each end wall 36 in a similar interlocking manner if desired.

Figure 11:
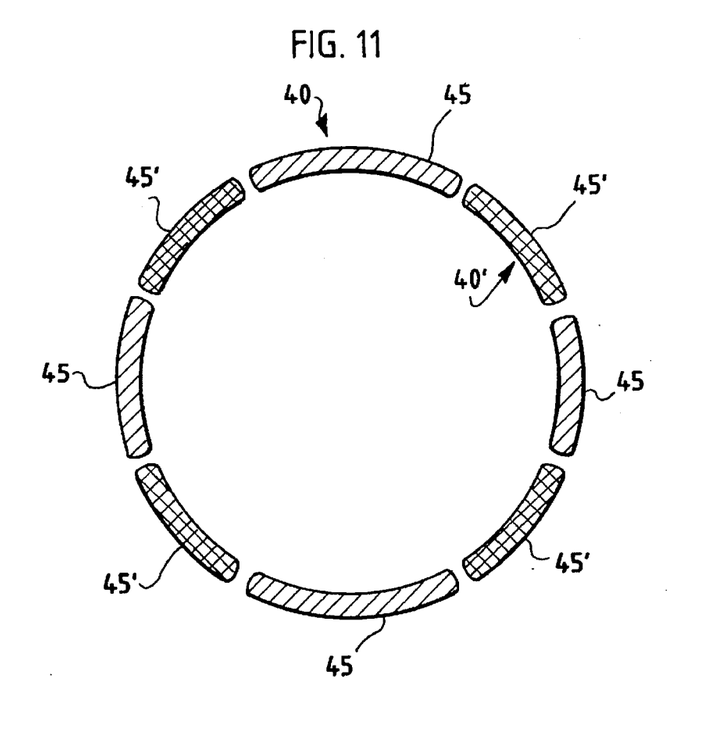
FIG. 11 is a schematic end view showing another representative relationship between the pressure ridges of adjacent filter cartridges.

In addition to preventing leakage of unfiltered fluid, the pressure ridges 40 and 40' of adjacent filter cartridges 30 likewise may be configured to prevent relative rotation of the filter cartridges 30 about the outlet 22. For purpose of example, and not limitation. FIG. 11 schematically depicts one such relationship. Pressure ridge 40 is formed as a series of segments 45 on the end wall of one filter cartridge, while pressure ridge 40' is formed as a series of segments 45' on the end wall of an adjacent filter segment. As shown in FIG. 11, the segments 45 and 45' are arcuate in shape, such that the pressure ridges 40 and 40' defined by the respective series of segments are concentric circles having equivalent diameters. By appropriately spacing the segments 45 and 45' of each series, the pressure ridges 40 and 40' may be configured to interlock else shown in FIG. 11 when the corresponding filter cartridges are positioned adjacent each other on the outlet with a gasket placed therebetween. A similar series of segments also may be provided on the inner surface of the closed end 15 of the housing 10, so as to interlock with a corresponding pressure ridge 40 located on the end filter cartridge 30. The pressure ridges 40 and 40' thus prevent relative rotation of the filter cartridges 30, as well as leakage of unfiltered fluid to the outlet 22.

In view of the description above, it is evident that the present invention not only removes contaminants from unfiltered fluid, but also prevents leakage of unfiltered fluid. The apparatus and method of the present invention are simple and inexpensive to construct and perform, respectively, yet provide enhanced efficiency as well as reduced operating and maintenance costs.

Although reference has been made to the use of the present invention with dry cleaning fluid systems for the purpose of explanation, it is understood that alternative fluid systems likewise may benefit from the present invention. It also will be apparent to those skilled in the art that various modifications and variations can be made in the design and construction of the filter cartridge and system, as well as in the performance of the method, without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A filter cartridge assembly for use in a filter system, the filter system including a housing for containing the filter cartridge assembly, an inlet for introducing unfiltered fluid into the housing, and an outlet extending into the housing for draining filtered fluid therefrom after filtration has occurred, the filter cartridge assembly comprising:

at least two filter cartridges to be positioned adjacent each other on the outlet within the housing, each filter cartridge including         filter material configured into a tubular shape having opposite ends so as to surround the outlet when the filter cartridge is positioned thereon within the housing,         an end wall provided at each end of the filter material, each end wall having an inside surface facing the filter material, an outside surface opposite the inside surface, and an aperture formed therethrough corresponding to a cross-section of the outlet such that the outlet may be received by the apertures to position the filter cartridges thereon with adjacent end walls of the filter cartridges facing each other, and a pressure ridge located on each end wall so as to substantially encompass the aperture formed through the end wall, the pressure ridge extending outwardly from the outside surface of the end wall, wherein the pressure ridge on each adjacent end wall is configured to substantially interlock with the pressure ridge on the facing adjacent end wall; and a gasket placed between the adjacent end walls of the filter cartridges, the pressure ridge on each adjacent end wall in sealing engagement with the gasket to prevent leakage of unfiltered fluid between the filter cartridges.

2. The filter cartridge assembly of claim 1, wherein the pressure ridge on each end wall is an impression forming a protrusion on the outside surface of the end wall.

3. The filter cartridge assembly of claim 1, wherein the pressure ridge on each end wall is a bead attached to the outside surface of the end wall.

4. The filter cartridge assembly of claim 1, wherein each pressure ridge has an overall height between about 1/32 and 1/2 inch above the outside surface of the end wall.

5. The filter cartridge assembly of claim 1, wherein the pressure ridge on each end wall has a curved outer surface having a radius of at least about 1/32 inch.

6. The filter cartridge assembly of claim 1, wherein the pressure ridge on each adjacent end wall is a series of segments configured to substantially encompass the aperture and interlock with the pressure ridge on the facing adjacent end wall.

7. The filter cartridge assembly of claim 1, wherein the pressure ridge on each adjacent end wall has an overall dimension different from an overall dimension of the pressure ridge located on the facing adjacent end wall so as to interlock therewith.

8. The filter cartridge assembly of claim 1, wherein an additional pressure ridge is located on the end wall of at least one of the filter cartridges so as to substantially encompass the first pressure ridge.

9. The filter cartridge assembly of claim 1, wherein the filter material includes a first filter material for removing insoluble contaminants from the fluid, and a second filter material for removing soluble contaminants from the fluid.

10. The filter cartridge assembly of claim 1, wherein each filter cartridge further includes an outer wall extending between and connected to the end walls, the outer wall being sufficiently porous to allow unfiltered fluid to pass therethrough for subsequent filtration by the filter material.

11. A filter system for filtration of a fluid, the filter system comprising:

a housing including an inlet for introducing unfiltered fluid into the housing and an outlet having a length extending into the housing for draining filtered fluid from the housing after filtration has occurred;

at least two filter cartridges positioned adjacent each other on the outlet within the housing, each filter cartridge including filter material configured into a tubular shape having opposite ends so as to surround the outlet when the filter cartridge is positioned thereon within the housing, an end wall provided at each end of the filter material, each end wall having an inside surface facing the filter material, an outside surface opposite the inside surface, and an aperture formed therethrough corresponding to a cross-section of the outlet such that the length of the outlet may be received by the apertures to position the filter cartridges thereon within the housing with adjacent end walls of the filter cartridges facing each other, and a pressure ridge located on each end wall so as to substantially encompass the aperture formed through the end wall, the pressure ridge extending outwardly from the outside surface of the end wall, wherein the pressure ridge on each adjacent end wall is configured to substantially interlock with the pressure ridge on the facing adjacent end wall; and a gasket placed between the adjacent end walls of the filter cartridges, the pressure ridge on each adjacent end wall in sealing engagement with the gasket to prevent leakage of unfiltered fluid to the outlet.

12. The filter system of claim 11, wherein the pressure ridge on each end wall is an impression forming a protrusion on the outside surface of the end wall.

13. The filter system of claim 11, wherein the pressure ridge on each end wall is a bead attached to the outside surface of the end wall.

14. The filter system of claim 11, wherein the shape of the aperture formed through each end wall is a circle, and the pressure ridge on each end wall forms a circle concentric with the aperture.

15. The filter system of claim 11, wherein an additional pressure ridge is located on each end wall so as to substantially encompass the first pressure ridge.

16. The filter system of claim 11, wherein each gasket is made of deformable material, the pressure ridge on each end wall deforming the adjacent gasket when in sealing engagement therewith.

17. The filter system of claim 11, wherein the pressure ridges of the adjacent end walls have different overall dimensions to interlock with each other.

18. The filter system of claim 11, wherein the pressure ridges of the adjacent end walls include series of segments configured to interlock with each other.

19. A method of preventing leakage of unfiltered fluid through a filter system, the filter system including a housing for containing a filter cartridge, an inlet for introducing unfiltered fluid into the housing, and an outlet having a length extending into the housing for draining filtered fluid from the housing after filtration has occurred, the method comprising the steps of:

providing at least two filter cartridges to be positioned adjacent each other on the outlet within the housing, each filter cartridge including filter material configured into a tubular shape having opposite ends so as to surround the outlet when the filter cartridge is positioned thereon, the filter cartridge further including an end wall provided at each end of the filter material, each end wall having an inside surface facing the filter material, an outside surface opposite the inside surface, and an aperture formed therethrough corresponding to a cross-section of the outlet such that the length of the outlet may be received by the apertures to position the filter cartridges thereon within the housing with adjacent end walls of the filter cartridges facing each other;

locating a pressure ridge on each end wall so as to substantially encompass the aperture formed through the end wall, the pressure ridge extending outwardly from the outside surface of the end wall, wherein the pressure ridge on each adjacent end wall is configured to substantially interlock with the pressure ridge on the facing adjacent end wall;

positioning one of the filter cartridges on the length of the outlet with the outlet received by the apertures;

placing a gasket on the outlet adjacent one end of the filter cartridge; and positioning another filter cartridge on the length of the outlet with the outlet received by the apertures such that adjacent end walls of the filter cartridges are facing each other with the gasket therebetween, the pressure ridges on the adjacent end walls interlocking with each other so that the pressure ridge on each adjacent end wall is in sealing engagement with the gasket to prevent leakage of unfiltered fluid to the outlet.

20. The method of claim 19, wherein the locating step includes impressing each end wall to form a protrusion on the outside surface of the end wall.

21. The method of claim 19, wherein the locating step includes attaching a bead to the outside surface of the end wall.

22. The method of claim 19 further including the step of locating an additional pressure ridge on each end wall so as to substantially encompass the first pressure ridge.

23. The method of claim 19 further including the step of securing the filter cartridge and adjacent end gaskets on the outlet in sealing engagement with each other.

24. The method of claim 19, wherein the locating step includes forming the pressure ridges of the adjacent end walls with different overall dimensions to interlock with each other.

25. The method of claim 19, wherein the locating step includes forming the pressure ridges of the adjacent end walls as series of segments configured to interlock with each other.

* * * * *